June 4, 1968

L. O. HAYDEN 3,386,364

SYNCHRONOUS INTERVALOMETER

Filed July 19, 1965

INVENTOR
LEONARD O. HAYDEN

BY

ATTORNEY

June 4, 1968  L. O. HAYDEN  3,386,364
SYNCHRONOUS INTERVALOMETER

Filed July 19, 1965  4 Sheets-Sheet 2

TO SWITCH 18 OF SHUTTER
CONTROL UNIT 15

INVENTOR
*LEONARD O. HAYDEN*

BY
ATTORNEY

June 4, 1968    L. O. HAYDEN    3,386,364
SYNCHRONOUS INTERVALOMETER
Filed July 19, 1965    4 Sheets-Sheet 4

INVENTOR
LEONARD O. HAYDEN

BY
ATTORNEY

United States Patent Office 3,386,364
Patented June 4, 1968

3,386,364
SYNCHRONOUS INTERVALOMETER
Leonard O. Hayden, Accokeek, Md., assignor to the United States of America as represented by the Secretary of the Navy
Filed July 19, 1965, Ser. No. 473,250
11 Claims. (Cl. 95—53)

ABSTRACT OF THE DISCLOSURE

A tracking camera for photographing moving objects wherein the film exposure times are varied according to a predetermined code and the sequential exposures are synchronized with universal time. A code generator comprising a series of cascaded bistable multivibrators is used to produce a pattern of time varying pulses which control the camera shutter so that the resultant photograph provides a dashed trail with each dash synchronized with a known interval of universal time.

---

The invention described herein may be manufactured and used by or for the Government of the United States of America for governmental purposes without the payment of any royalties thereon or therefor.

The present invention relates to a method and apparatus for photographically tracking a moving object, and in particular, to a method and apparatus for photographing the path of an object wherein the exposure times are determined by a predetermined code which is synchronized with a time reference.

Satellite tracking stations usually employ photographic equipment including cameras having mechanically controlled shutters which are alternately opened and closed according to a predetermined code. The photographs produced show a dashed satellite trail having varying segments from which the time position coordinates of the satellite may be identified. In the past, various mechanical techniques have been employed to produce a time coded control for the camera shutter. One technique involves the use of a notched wheel wherein the notches are spaced in accordance with the desired code. However, wearing of the notches results in time interval variations. Electronic devices have also been employed which produce pulses for controlling camera shutters. However with these devices the beginning and ending of an exposure interval is not synchronized with Universal Time, and each event must be compared with a separate recording. In all of the prior techniques it has been necessary for the analyst interpreting the photographed satellite trail to determine the time of each shutter actuation by a separate time measurement for each shutter actuation by comparing each dash of the photograph with time markers indicative of Universal Time which are separately recorded during the observation period.

The general purpose of the present invention is to provide a method and apparatus for producing photographs of a satellite trail wherein the exposure times are accurately controlled in accordance with a time code which is synchronized with the second of Universal Time. This system embraces all the advantages of similarly employed camera systems and possesses none of the aforesaid disadvantages. To attain this, the present invention contemplates a unique system having a control circuit for synchronously controlling the solenoid actuated shutter of a camera. The circuit is synchronized with each second of Universal Time thus obviating the time consuming comparison of each individual photographic event with recorded timing marks. The code generator receives a one pulse per second timing signal from the satellite tracking station clock, which produces an external timing signal, and produces a pulse code which operates the shutter solenoid. The code generator comprises a series of cascaded bistable multivibrators or flip-flops the first of which is coupled to the station clock by a monostable multivibrator or single shot. Selected outputs from the series of cascaded flip-flops are coupled to a synthesizing circuit of the code generator which produces a pulse which actuates the camera shutter for a predetermined exposure period which varies synchronously at predetermined times. The method provided by this invention involves generating a fixed pattern of time varying pulses for the duration of a predetermined repetitive fixed interval of time, correlating or synchronizing the fixed interval with Universal Time, correlating or synchronizing each time varying pulses with the second of Universal Time, and then photographing the orbiting satellite while it is within the camera's field of view in accordance with the generated pattern of pulses.

An object of the present invention is to provide a new and improved camera system and method for photographing a moving object at accurately timed varying intervals.

Another object is to provide a satellite tracking camera for producing a photograph of a trail of a moving object wherein the exposure times are automatically and synchronously varied.

A further object of the invention is the provision of a camera system wherein the camera shutters are accurately actuated in accordance with a predetermined code which is synchronized with the second of Universal Time.

Still another object is to provide a novel electronic control device for producing a predetermined code for accurately actuating a camera shutter.

Yet another object of the present invention is the provision of a novel electronic control device which is triggered by and synchronized with the second of Universal Time for producing an accurate time code.

A further object of this invention is to provide a method of photographing a moving object in accordance with a predetermined time code wherein the time code is synchronized with Universal Time so that the resultant photograph provides a dashed trail wherein a given time of said trail is synchronized with Universal Time and wherein each dash is synchronized with the second of Universal Time.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
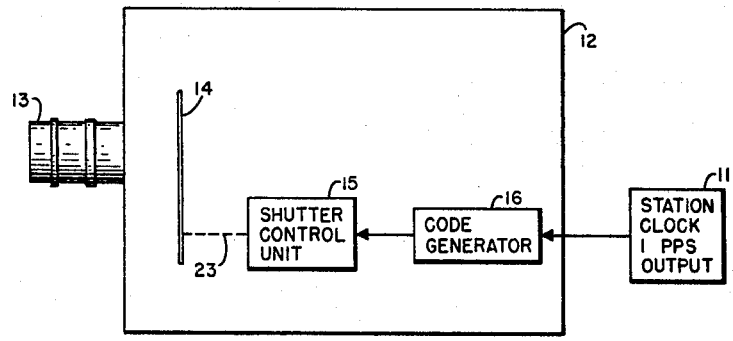
FIG. 1 shows a simplified diagrammatic representation of the satellite camera system of this invention.
Figure 2:
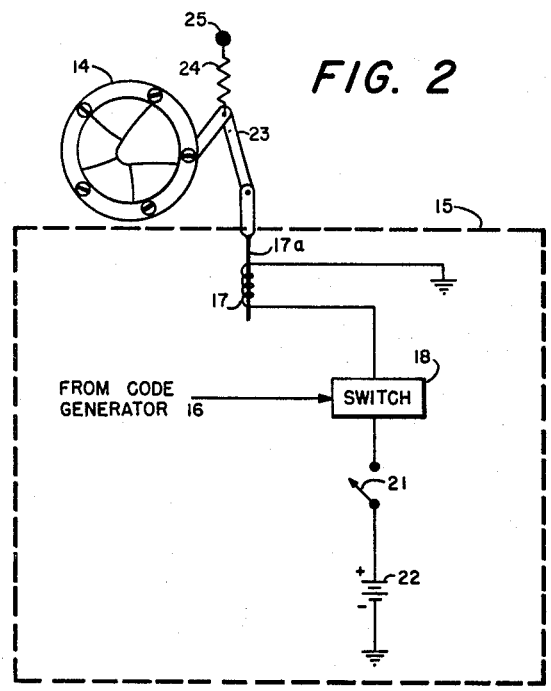
FIG. 2 is a schematic diagram of the shutter control unit of the satellite tracking camera.

Referring now to the drawings, there is shown in FIG. 1 the camera system of this invention connected to receive a one pulse per second signal from a satellite observation station clock source 11 which is synchronized with the second of Universal Time. A camera housing 12 is shown having a lens 13 attached thereto. Housing 12 has within it a shutter 14 and a conventional camera mechanism which is not completely shown for purpose of simplification. A shutter control unit 15 is mechanically coupled to actuate shutter 14 through actuating lever 23 upon receipt of a pulse of proper polarity from the code generator 16 which is more fully described with reference to FIG. 3. The code generator is triggered by and synchronized with the satellite station clock (by means of a reset circuit) which in turn is synchronized with the second of Universal Time. The invention employs a conventional camera having a solenoid operated shutter control as shown in FIG. 2. The code generating electronics may be packaged within a housing as shown in FIG. 1 or may be completely external to the camera. By means of the latter arrangement, a conventional camera having a solenoid actuated shutter may be used without modification of the standard camera housing. The shutter control unit 15 is as shown in FIG. 2 and comprises a solenoid 17 having a plunger 17a coupled to shutter 14 for actuating shutter 14 through actuating lever 23 when switch 18 is energized by the signal from code generator 16. Actuating lever 23 is biased by a spring 24 which is coupled between lever 23 and a fixed point 25. Spring 24 pulls actuating lever 23 towards the closed shutter position. One end of solenoid 17 is connected to ground while the other end is connected through switch 18, which may be any suitable ON-OFF type of switch such as a switching transistor, and through Start-Stop switch 21 to voltage source 22. When the proper polarity signal is received from code generator 16, switch 18 conducts thus energizing the solenoid circuit if Start-Stop switch 21 is closed. Start-stop switch 21 is a single-pole single-throw switch for enabling or disabling the shutter control circuit. When switch 21 is closed, at a time when photographs are to be taken, current flows from the voltage source 22 through switch 18 (if switch 18 is ON) and solenoid 17 thereby energizing solenoid 17 so that plunger 17a actuates shutter 14 through lever 23. Switch 21 is manually operated and remains closed for the period during which photographs of a satellite are to be taken. While switch 21 is closed, the shutter is actuated whenever a pulse is received by switch 18 from code generator 16.

Figure 3:
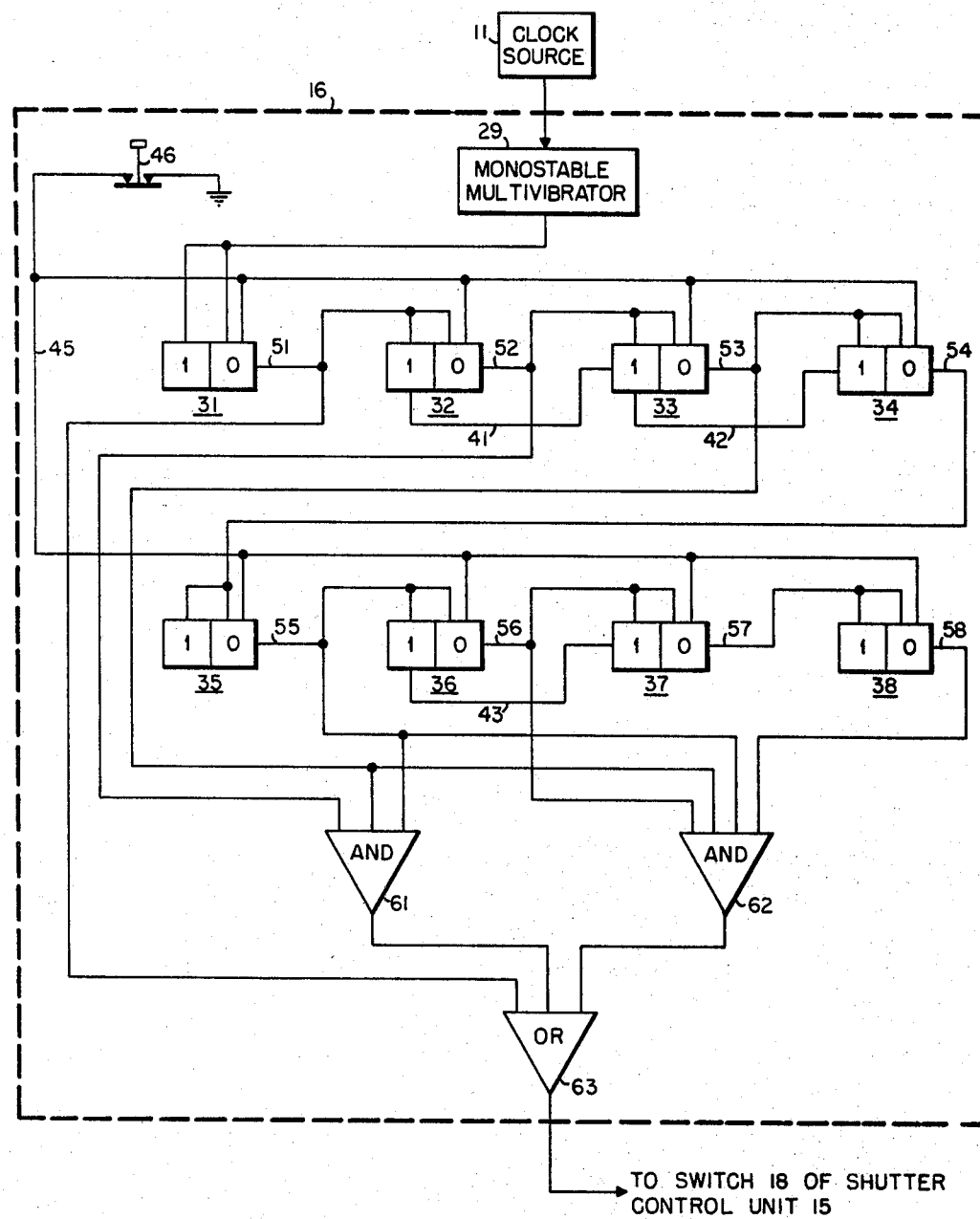
FIG. 3 is a block diagram of the code generator of the camera system.

The code generator 16 is shown in FIG. 3 and comprises a series of eight cascaded conventional bistable multivibrators or flip-flops 31–38 connected so that predetermined timing pulse chains are obtained at several selected flip-flop outputs 51, 52, 53, 55, 56 and 58. Flip-flops 31–38 are connected so that "0" output of one is coupled to the "1" and "0" input of the next succeeding flip-flop stage. Clock source 11, which produces an output signal every second, is connected to a monostable multivibrator or single shot 29 which in turn produces pulses at the rate of one per second for triggering flip-flop 31. The flip-flops may be designed so that they are triggerable by either a negative or positive-going signal. However, for purposes of explanation, a negative-going signal changes the state of a flip-flop, and single-shot 29 produces a negative-going pulse of a duration sufficient for triggering flip-flop 31 upon receipt of a time pulse from clock 11.

Flip-flops 31–38 are connected so that the pulse trains at outputs 51–53, 55, 56 and 58 are as shown in FIG. 4(b) through (g). The flip-flop stages are connected so that the "1" output of stage 33 is connected to a "1" input of stage 32 and the "1" output of stage 34 is connected to a "1" input of stage 33. The two feedback loops 41 and 42 in the first group of flip-flop 31–34 in effect provide a division ratio of 10:1 at the output of flip-flop 34, as opposed to a division of 16:1 normally obtained with a set of four cascaded flip-flops without feedback. A feedback loop 43 is also provided between the "1" output of flip-flop 37 and a "1" input of flip-flop 36 so that the desired pulse pattern is obtained at outputs 56 and 57 as shown in FIG. 4(f) and 4(g) respectively. By means of feedback loop 43, the second group of four flip-flops 35–38 provides a division ratio of 12:1 so that all eight flip-flops 31–38 provide a total division ratio of 120:1 at the output of flip-flop 38. Where the input frequency is one pulse per second, the interval is therefore two minutes. A reset line 45 is connected through a normally closed push-button switch 46 to ground for initially resetting all of the flip-flops 31–38 to the "0" state.

Figure 4:
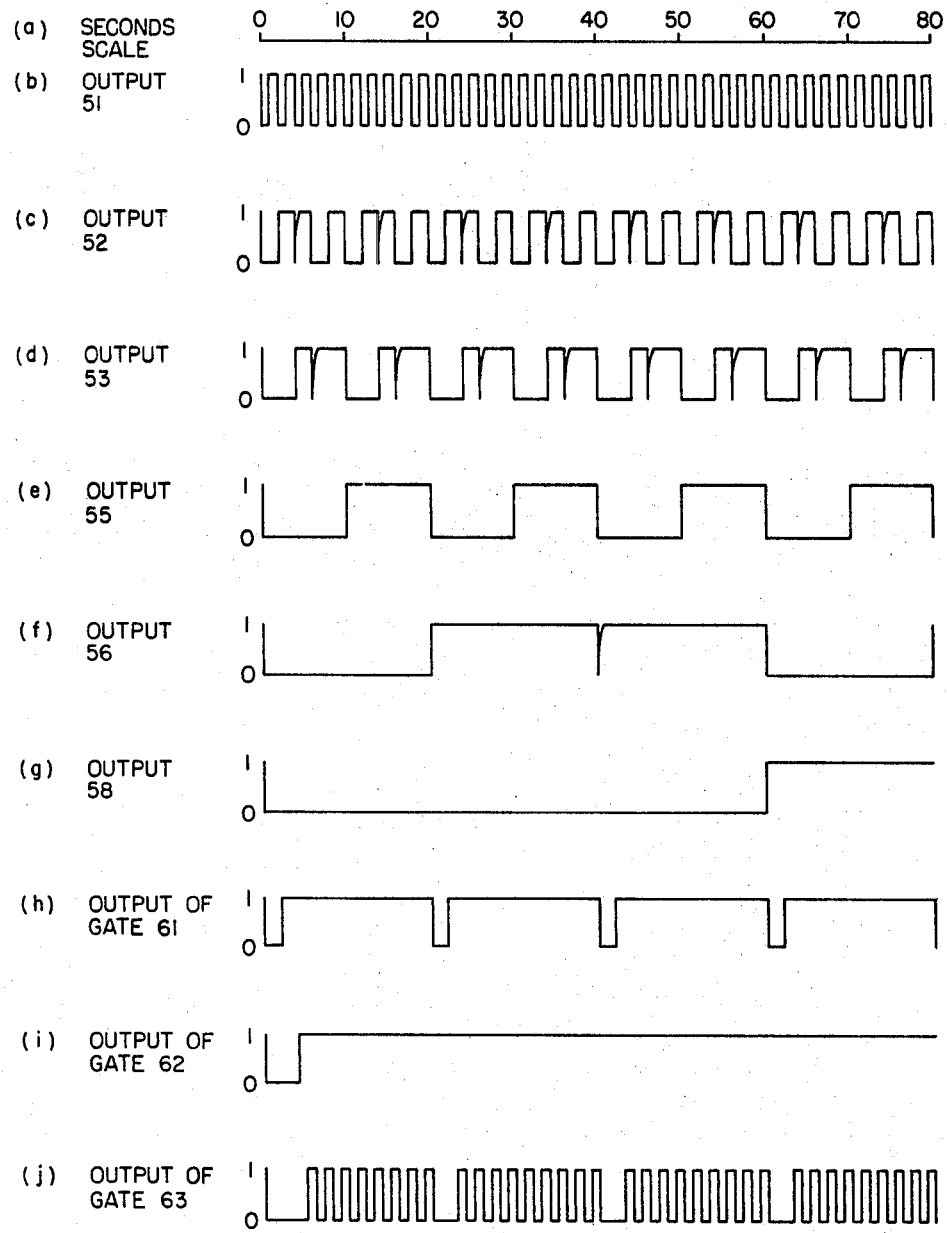
FIG. 4 is a series of timing diagrams representing various signals of the code generator.

The timing diagrams of FIG. 4 are shown for illustrative purposes over a period of 80 seconds. However the true interval is a 120-second in practice since the beginning of the cycle at time zero of FIG. 4(a) repeats every two minutes on the even minute. The beginning of this two-minute period is marged by the five-second pulse at the output of OR gate 63 as shown in FIG. 4(j).

In operation, the flip-flop inputs are sensitive only to negative-going inputs. For purposes of description, the outputs 51–58 (the right or "0" side of each flip-flop 31–38) are negative or low whenever the flip-flop is in the "0" state. Outputs 51–58 are therefore positive or high whenever the flip-flop is in the "1" state. The signals at the outputs of the left or "1" side of each flip-flop, which are shown only for flip-flops 33, 34 and 37, are of opposite polarity to the signals at the "0" outputs.

Clock source 11, which is synchronized with the second of Universal Time, continually triggers single-shot 29 at a one pulse-per-second rate. Single-shot 29 produces a negative pulse of sufficient pulse width for triggering flip-flop 31. Synchronization is established at any even minute (0, 2, 4, 6 etc.) of Universal Time by resetting all the flip-flops to the "0" state by pressing push-button 46 until just after an even-minute pulse is received from the clock source 11 and then releasing push-button 46 before the next pulse. All outputs 51–58 are "0" after the initial resetting operation so that the next negative-going pulse (occurring at an odd second) from single-shot 29 changes flip-flop 31 from the "0" to the "1" state. A change from "0" to "1" causes the "0" output of 51 to go positive (high). Since the flip-flops are insensitive to positive going pulses flip-flop 32 remains in the "0" state. The next-succeeding pulse (even second) changes flip-flop 31 back to the "1" state so that "0" output 51 has a negative-going pulse which changes the condition of flip-flop 32 to the "1" state, and so on in a conventional manner. Feedback loops 41–43 modify the basic counter structure to provide the waveforms at outputs 51–53, 55, 56 and 58 as shown in FIGS. 4(b) through (g). As is evident from FIGS. 4(b) through (d), after flip-flop 32 changes from "0" to "1," the next-succeeding negative-going pulse from flip-flop 31 causes flip-flop 32 to change briefly from "1" to "0" so that flip-flop 33 changes from "0" to "1" thereby producing a negative-going pulse at its "1" output which is fed back to a "1" input of flip-flop 32 to quickly return flip-flop 32 to the "1" state. The "spike" produced by this operation is usually negligible and can be deleted if necessary. By means of feedback loop 42 from the "1" output of flip-flop 34 to a "1" input of flip-flop 33, a negative-going pulse produced in feedback loop 42 when flip-flop 34 changes from the "1" to the "0" state causes flip-flop 33 to quickly return to the "1" state after it has been triggered by a negative-going pulse from flip-flop 34. Similarly, a negative-going pulse produced at the "1" output of flip-flop 37 when flip-flop 37 changes from the "1" to the "0" state is fed back to a "1" input of flip-flop 36 by feedback loop 43 so that flip-flop 36 is immediately returned to the "1" state after it is triggered by a negative-going pulse from flip-flop 35.

Outputs 51–53, 55, 56 and 58 of FIG. 3 are connected to the synthesizing circuitry which comprises AND gates 61 and 62 and OR gate 63. AND gate 61 produces a negative (low) level as shown in FIG. 4(h) only when all outputs 52 (FIG. 4(c)), 53 (FIG. 4(d)) and 55 (FIG. 4(e)) are negative (low), i.e., when flip-flops 32, 33 and 35 are all in the "0" state. AND gate 62 produces a negative level as shown in FIG. 4(i) only while outputs 53 (FIG. 4(d)), 55 (FIG. 4(e)), 56 (FIG. 4(f)) and 58 (FIG. 4(g)) are all negative, i.e., while flip-flops 33, 35, 36 and 38 are all in the "0" state. OR gate 63 has three inputs, one of which is connected to the output of AND gate 61, another to the output of AND gate 62 and the other to "0" output 51 of flip-flop 31. OR gate 63 produces a negative output as shown in FIG. 4(j) whenever any of the signals shown in FIG. 4(b), (h), or (i) is negative or low. The output of OR gate 63 is connected to the shutter control unit 15 (FIG. 1) so that exposure occurs while the OR gate output is negative thereby forming a dashed or segmented satellite trail on a typical photograph as shown in FIG. 5.

Figure 5:
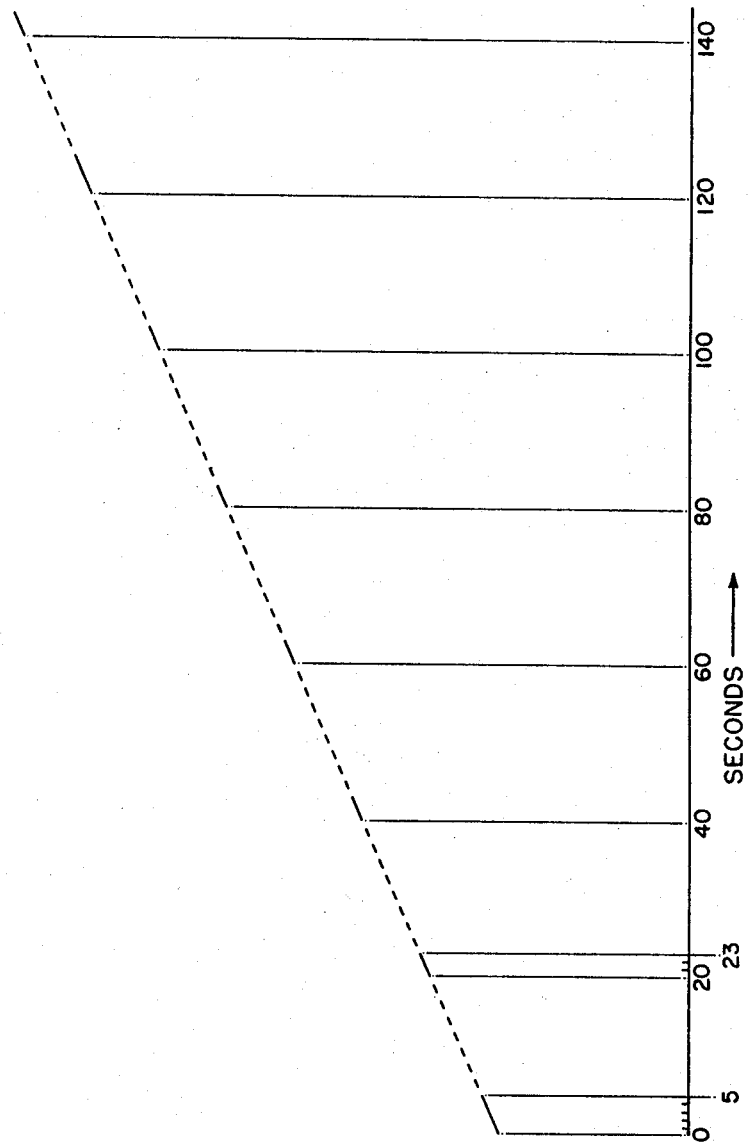
FIG. 5 represents a typical photograph of a satellite path segmented in accordance with a predetermined time code as obtained by means of this invention.

The exposure time illustrated in FIG. 5 correspond to FIG. 4(j) which is the signal controlling the shutter control unit 15. Exposure occurs (while switch 21 of FIG. 2 is closed) whenever the signal of FIG. 4(j) is "0" or negative. Hence the shutter opens on even seconds and closes on odd seconds during the basic exposure cycle. Exposure time is extended to 3 seconds at 0, 20 and 40 seconds, repeating for every minute. The signal controlling the 3-second exposure is the 2-second pulse of AND gate 61 as shown in FIG. 4(h). The exposure time is extended to 5 seconds at the beginning of even minutes. The controlling signal for the 5-second exposure is the 4-second pulse of AND gate 62 as shown in FIG. 4(i).

The Universal Time for any photographic event of FIG. 5 is readily determined after a correlation has been made of a single photographic event with Universal Time. This correlation is made by conventional techniques and involves a single comparison with a separate time recording. In many cases the position of a satellite as a function of time is known to an accuracy of within ±1 minute of the satellite's passing of a given point in space such as a stellar reference. In these cases the synchronized code on the photograph alone is sufficient to determine the exact time of each exposure without any auxiliary time recording. Once a Universal Time correlation is established for any photographic event all other times for the remaining events are known as long as cycling of the flip-flop is initially synchronized with Universal Time by manually resetting the flip-flops by push-button switch 46 at an even minute, within one second after the even minute, to produce the timing diagrams as shown in FIG. 4. After cycling is synchronized with Universal Time, the next step is to close Start-Stop switch 21 as the Satellite enters the field of view to enable the camera so that the satellite is photographed. After the satellite has passed out of the camera's field of view, Start-Stop switch 21 is opened to disable the camera.

As an alternative to the manual resetting operation described herein, a single synchronizing pulse, having a known relationship with Universal Time is automatically applied to reset the flip-flops 31-38. In addition, such synchronizing pulse may be applied automatically at 120-second intervals. In either case, the manual resetting operation employing push-button switch 46 of FIG. 3 is avoided.

Throughout this description the exposure times of FIG. 5 have been referred to as being synchronized with Universal Time. However it should be noted that a delay is caused by the finite time for opening and closing the shutter. Since this time delay is a measurable constant, allowances for this can readily be made by conventional methods when interpreting the photographs obtained by means of this invention.

It is to be noted that the duration of the repeating interval was chosen as 120 seconds for purposes of illustration and that any other suitable interval may be used depending upon the particular application. The code pattern within the interval may also be varied accordingly by simply choosing the flip-flop outputs which produce the desired code. Furthermore, any suitable bistable element such as tunnel diodes, on-off switches, and so forth may be employed as the elements of code generator 15.

It is to be further noted that the method and apparatus herein disclosed may be employed in many other applications such as for tracking missiles, aircraft, or any other object of which a photographic record is obtainable and wherein a correlation between the object and a time reference is desired.

In summary, the present invention provides a satellite tracking method and apparatus for photographing an orbiting satellite in accordance with a predetermined time code which is repetitive after a fixed interval and synchronized with the second of Universal Time. The time code is generated by a novel circuit which is triggered by a timing signal from a clock source which is synchronized with the second of Universal Time. The output of the circuit controls the opening and closing of the camera shutter so that the exposure times are synchronized with Universal Time and correspond to the output of a time code generating circuit.

Obviously many modifications and variations of the present invention are possible in the light of the above teachings. It is therefore to be understood, that within the scope of the appended claims, the invention may be practiced otherwise than as specifically described. What is claimed and desired to be secured by Letters Patent of the United States is:

1. In a camera having a shutter, a solenoid for actuating said shutter and solenoid control means coupled to said solenoid, together with an input for receiving timing signals, code generator means for triggering said solenoid control means in accordance with a time coded signal generated upon receipt of said timing signal comprising:

a monostable multivibrator for receiving said timing signal, a series of cascaded bistable multivibrators having the first bistable multivibrator coupled to said monostable multivibrator, each of said bistable multivibrators having an output coupled to the input of the next-succeeding bistable multivibrator, first gating means coupled to the outputs of a first group of bistable multivibrators for producing an output pulse when the signals at the outputs of said first group are at the same preselected polarity, second gating means coupled to the outputs of a second group of bistable multivibrators for producing an output pulse when the signals at the outputs of said second group are at the same preselected polarity, and third gating means having a first input coupled to the output of said first gating means, a second input coupled to the output of said second gating means and a third input coupled to the output of the first bistable multivibrator of said series of bistable multivibrators for producing an output when a pulse of a given polarity is present at any of said inputs, said third means having its output coupled to the solenoid control means of said camera for actuating said shutter solenoid when said third gating means produces an output signal.

2. In a camera system in accordance with claim 1, wherein said code generator includes means for simultaneously resetting said bistable multivibrators.

3. In a satellite tracking camera system having a camera with a shutter, and shutter control means for actuating said shutter, together with an input for receiving timing signals, a code generator for energizing said control means in accordance with a time code generated upon receipt of said timing signals comprising:

a monostable multivibrator for receiving said timing signal, a plurality of bistable multivibrators each having a "1" input, a "0" input, a "1" output, and a "0" output, and each of said "0" outputs coupled to the "1" and "0" input of the next-succeeding bistable multivibrator, a first AND gate having a plurality of inputs and an output, with each of said inputs coupled to one of a first group of "0" outputs of said bistable multivibrators, a second AND gate having a plurality of inputs and an output, with each of said inputs coupled to one of a second group of "0" outputs of said bistable multivibrator, an OR gate having a first, second and third input and an output, said first input coupled to the output of said first AND gate, said second input coupled to the output of said second AND gate, and said third input coupled to the "0" output of said first bistable multivibrator of said series, and said OR gate output coupled to said shutter control means.

4. In a camera system in accordance with claim 3, wherein said code generator includes means for simultaneously resetting said bistable multivibrators.

5. In a satellite tracking camera system as set forth in claim 4, wherein said code generator comprises eight bistable multivibrators and wherein a first feedback loop is coupled between said third and second bistable multivibrators, a second feedback loop is coupled between said fourth and third bistable multivibrators, and a third feedback loop is coupled between said seventh and sixth bistable multivibrators, and wherein the outputs coupled to said first AND gate are the "0" outputs of said second, third and fifth bistable multivibrators, and the outputs coupled to said second AND gate are the "0" outputs of said third, fifth, sixth and eighth bistable multivibrators.

6. In a satellite tracking camera system as set forth in claim 5 wherein said second, third and sixth bistable multivibrators have an additional "1" input and wherein said first feedback loop is connected between the "1" output of said third bistable multivibrator and the additional "1" input of the second bistable multivibrator, said second feedback loop is connected between the "1" output of said fourth bistable multivibrator and the additional "1" input of said third bistable multivibrator, and said third feedback loop is connected between the "1" output of the seventh bistable multivibrator and the additional "0" input of said sixth bistable multivibrator.

7. A camera for producing photographs wherein each photographed event is synchronized with the second of Universal Time comprising:

a shutter in said camera, shutter control means for controlling said shutter including:

a solenoid, a plunger coupled to said solenoid and to said shutter, and switch means coupled to said solenoid for energizing said solenoid, a code generator coupled to said switch means of said shutter control means for generating variable duration signals synchronized with Universal Time, said signals having durations which indicate Universal Time, and input means coupled to said code generator for receiving timing signals synchronized with the second of Universal Time, said code generator including:

a series of cascaded bistable multivibrators, with the first of said multivibrators being coupled to said input means so that said first multivibrator changes condition in synchronization with the second of Universal Time, and with each of the other cascaded bistable multivibrators having an input coupled to the output of the next-preceding cascaded bistable multivibrator, gating means coupled to the outputs of a plurality of said bistable multivibrators for producing an output when the multivibrators of said plurality of said multivibrators are in predetermined conditions, said gating means having its output coupled to said switch means of said shutter control means for actuating said solenoid when said gating means produces an output signal.

8. A camera for producing photographs wherein each photographed event is synchronized with the second of Universal Time comprising:

a shutter in said camera, shutter control means for controlling said shutter, including:

a solenoid, a plunger coupled to said solenoid and to said shutter, and switch means coupled to said solenoid for energizing said solenoid, a code generator coupled to said switch means of said shutter control means, said code generator including:

a monostable multivibrator coupled to said input means, a plurality of cascaded bistable multivibrators having a first bistable multivibrator coupled to said monostable multivibrator, each of said bistable multivibrators having an output coupled to the input of the next-succeeding bistable multivibrator, first gating means coupled to the outputs of a first group of bistable multivibrators for producing an output pulse when the signals at the outputs of said first group are simultaneously at the same preselected polarity, second gating means coupled to the outputs of a second group of bistable multivibrators for producing an output pulse when the signals at the outputs of said second group are simultaneously at the same preselected polarity, third gating means having a first input coupled to the output of said firts gating means, a second input coupled to the output of said second gating means, and a third input coupled to the output of the first bistable multivibrator for producing an output when a pulse of a given polarity is present at any of said inputs, said third gating means having its output couled to the switch means of said shutter control means, and input means coupled to said code generator for receiving timing signals synchronized with the second of Universal Time.

9. A camera as set forth in claim 8 wherein said code generator includes means for simultaneously resetting said bistable multivibrators.

10. A camera as set forth in claim 9 wherein said code generator comprises eight bistable multivibrators and wherein a first feedback loop is coupled between said third and second bistable multivibrators, a second feedback loop is coupled between said fourth and third bistable multivibrators, and a third feedback loop is coupled between said seventh and sixth bistable multivibrators, and wherein the outputs coupled to the first gating means are the outputs of said second, third and fifth bistable multivibrators, and the outputs coupled to said second gating means are the outputs of said third, fifth, sixth and eighth bistable multivibrators.

11. A camera as set forth in claim 10 wherein each of said bistable multivibrators has a "0" input, a "1" input, a "0" output, a "1" output, with each of said outputs coupled to the "0" and "1" input of the next-succeeding bistable multivibrator, and wherein said first feedback loop is coupled between the "1" output of said third bistable multivibrator and said additional "1" input of said second bistable multivibrator, said second feedback loop is coupled between said "1" output of said fourth bistable multivibrator and said additional "1" input of said third bistable multivibrator, and said third feedback loop is coupled between said "1" output of said seventh bistable multivibrator and said additional "1" input of said sixth bistable multivibrator.

References Cited

UNITED STATES PATENTS

| | | | |
|---|---|---|---|
| 2,014,188 | 9/1935 | Pfeiffer | 95—12.5 |
| 2,468,781 | 5/1949 | Roganti | 95—12.5 |
| 2,533,800 | 12/1950 | Hearn | 95—60 |
| 2,987,976 | 6/1961 | Martin | 95—53 X |
| 3,095,795 | 7/1963 | Yates | 95—53 |
| 2,346,079 | 4/1944 | Newton | 95—12.5 |
| 2,460,163 | 1/1949 | Bowen | 95—36 |
| 2,663,217 | 12/1953 | Tuttle | 88—14 |

JOHN M. HORAN, *Primary Examiner.*